United States Patent
Fujishima et al.

(10) Patent No.: US 10,103,677 B2
(45) Date of Patent: Oct. 16, 2018

(54) CONTROL APPARATUS FOR ELECTRIC ROTATING MACHINE

(71) Applicant: DENSO CORPORATION, Kariya, Aichi-pref. (JP)

(72) Inventors: Yuya Fujishima, Kariya (JP); Akiyoshi Morii, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 15/062,603

(22) Filed: Mar. 7, 2016

(65) Prior Publication Data

US 2016/0276975 A1    Sep. 22, 2016

(30) Foreign Application Priority Data

Mar. 20, 2015 (JP) .................................. 2015-057172

(51) Int. Cl.
| | |
|---|---|
| H02P 6/08 | (2016.01) |
| B60W 10/11 | (2012.01) |
| H02P 29/60 | (2016.01) |
| H02P 29/68 | (2016.01) |
| H02P 21/22 | (2016.01) |

(52) U.S. Cl.
CPC ............ *H02P 29/60* (2016.02); *H02P 29/685* (2016.11); *H02P 21/22* (2016.02)

(58) Field of Classification Search
CPC .......... H01L 24/41; H01L 24/09; H01L 24/78
See application file for complete search history.

(56) References Cited

U.S. PATENT DOCUMENTS 6,392,376 B1 * 5/2002 Kobayashi ............ B60L 15/025
318/432

FOREIGN PATENT DOCUMENTS

| JP | 3710673 B2 | 10/2005 |
|---|---|---|
| JP | 2008-062916 A | 3/2008 |

* cited by examiner

*Primary Examiner* — Bickey Dhakal
*Assistant Examiner* — Charles S Laughlin
(74) *Attorney, Agent, or Firm* — Oliff PLC

(57) ABSTRACT

Upon determining that the absolute value of an electrical angular speed of a motor-generator is smaller than or equal to a threshold value, a control apparatus compensates a current detected by a U-phase current sensor based on a temperature detected by a U-phase temperature sensor and compensates a current detected by a V-phase current sensor based on an estimated temperature of a V-phase current sensor. On the other hand, upon determining that the absolute value of the electrical angular speed is larger than the threshold value, the control apparatus compensates the currents detected by the U-phase and V-phase current sensors based on temperature detected by the U-phase temperature sensor.

9 Claims, 13 Drawing Sheets

CONTROL APPARATUS FOR ELECTRIC ROTATING MACHINE

This application claims priority to Japanese Patent Application No. 2015-57172 filed on Mar. 20, 2015, the entire contents of which are hereby incorporated by reference.

BACKGROUND OF THE INVENTION

1. Field of the Invention

The present invention relates to a control apparatus for controlling a controlled variable of a three-phase electric rotating machine based on a detection value of a phase current flowing through the three-phase electric rotating machine.

2. Description of Related Art

A detection value of a phase current flowing through a three-phase electric rotating machine detected by a current detection section contains a current error depending on a detection value of the temperature of the current detection section. The current error may degrade the controllability of the controlled variable, causing the controlled variable to vary, for example. Accordingly, it is required to compensate the current detection value in accordance with the temperature detection value.

Japanese Patent No. 3710673 describes a technique to address such a requirement. This technique is used for a control system which includes three current detection sections provided corresponding to three phases of an electric rotating machine, and three temperature detection sections provided corresponding to the three current detection sections. According to this technique, it is possible to compensate current detection values of the current detection sections in accordance with the temperature detection values of the current detection sections. As a result, it becomes possible to increase the current detection accuracy to suppress effects of the current errors contained in the current detection values on the controllability of the controlled variable of the electric rotating machine.

Meanwhile, there is a case where the control system lacks a temperature detecting function for at least one of the current detection sections depending on the specification or state of the control system. However, even in such a case, it is required to compensate the current detection value of each of the current detection sections to increase the accuracy of current detection for each of the phase currents. Accordingly, in this case, it is necessary to estimate the temperature of any current detection section lacking the temperature detecting function.

SUMMARY

An exemplary embodiment provides a control apparatus for use in a control system which includes a power conversion circuit for applying an AC voltage to a three-phase electric rotating machine in accordance with power supplied, current detection sections provided corresponding to at least two of three phases of the electric rotating machine to detect phase currents of the electric rotating machine, and a temperature detection section provided corresponding to at least one of the current detection sections for detecting temperature of the current detection section, a subject current detection section being one of all the current detection sections, temperature of the subject current detection section being to be detected by a subject temperature detection section which is one of all the temperature detection sections, a non-subject current detection section being one of all the current detection sections other than the subject current detection section, the control apparatus including:

a temperature increase amount estimation section that estimates, for each of all the current detection sections, an amount of temperature increase of the current detection section due to a current flowing through the phase in which the current detection section is provided based on a current flowing through the current detection section;

a reference temperature calculation section that calculates a reference temperature by subtracting the temperature increase amount of the subject current detection section from a temperature detection value of the temperature detection section;

a temperature estimation section that estimates temperature of the non-subject current detection section by adding the reference temperature to the temperature increase amount of the non-subject current detection section;

a speed determination section that determines whether a rotational speed of the electric rotating machine is in a high speed region higher than a threshold speed or in a low speed region lower than or equal to the threshold speed;

a low speed rotation compensation section that compensates a current detection value of the subject current detection section based on the temperature detection value of the temperature detection section, and compensates the current detection value of the non-subject current detection section based on the temperature of the non-subject current detection section estimated by the temperature estimation section on condition that the rotational speed is determined to be in the low speed region by the velocity determination section;

a high speed rotation compensation section that compensates a current detection value of each of all the current detection sections based on the temperature detection value of each temperature detection section without using the temperature of the non-subject current detection section estimated by the temperature estimation section on condition that the rotational speed is determined to be in the high speed region by the speed determination section; and a control section that controls a controlled variable of the electric rotating machine by manipulating supply of power to the power conversion circuit using the compensated current detection value of each current detection section.

According to the exemplary embodiment, there is provided a control apparatus for an electric rotating machine, which can detect phase currents of the electric rotating machine with a high degree of accuracy to enable controlling a controlled variable of the electric rotating machine reliably and accurately.

Other advantages and features of the invention will become apparent from the following description including the drawings and claims.

PREFERRED EMBODIMENTS OF THE INVENTION

First Embodiment

Figure 1:
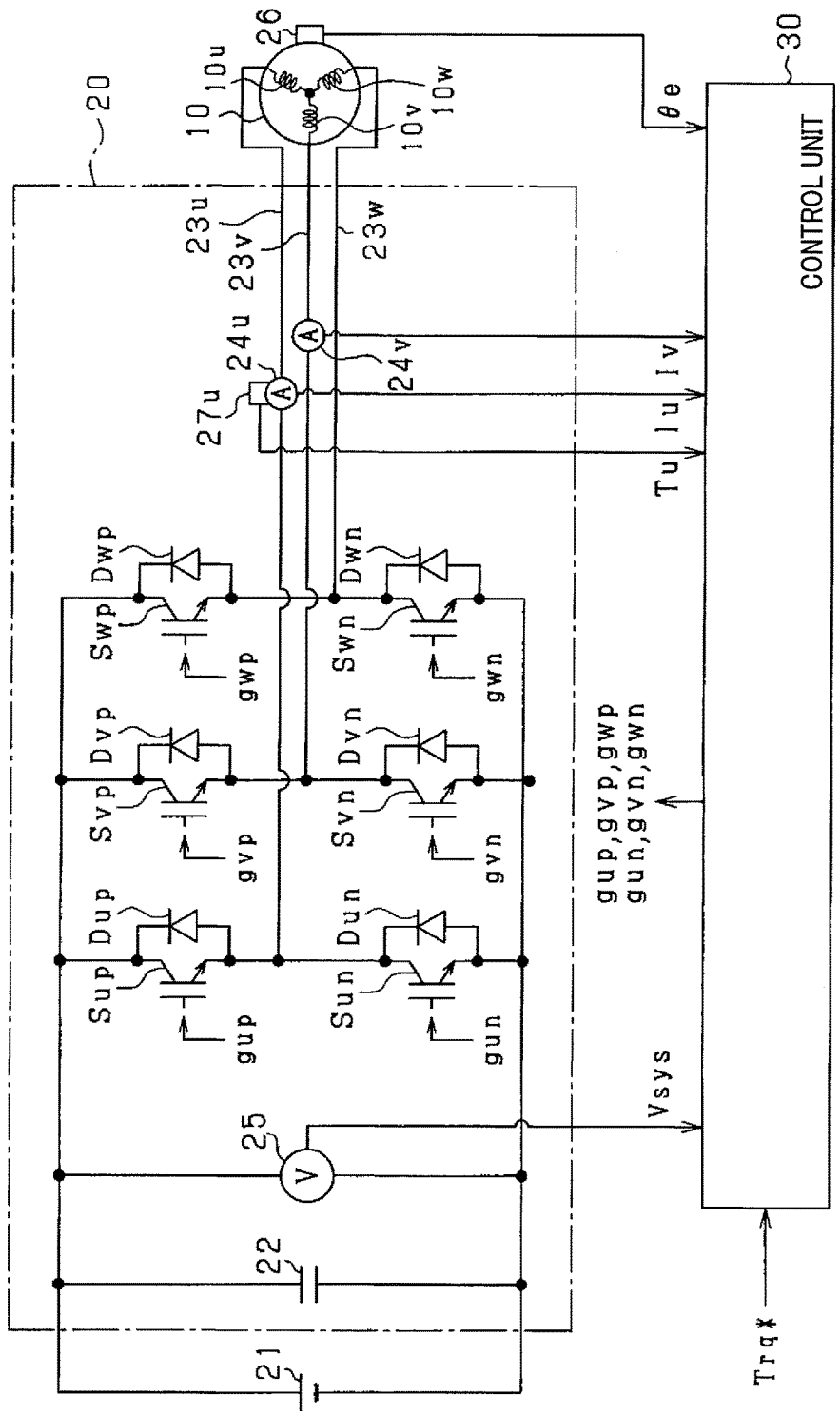
FIG. 1 is a diagram showing the overall structure of a motor control system as a first embodiment of the invention.

FIG. 1 is a diagram showing the overall structure of a motor control system as a first embodiment of the invention. This motor control system is mounted on a vehicle (an electric vehicle or a hybrid vehicle, for example) to control a three-phase electric rotating machine (a motor-generator, for example) which operates as a vehicle main engine.

As shown in FIG. 1, the motor control system includes a motor-generator 10, a three-phase inverter 20 as a power conversion circuit and a control unit 30 for controlling the motor-generator 10. The motor-generator 10 is an IPMSM (interior permanent magnet synchronous motor) of the salient-pole type.

The motor-generator 10 includes a stator (not shown) having a U-phase coil 10u, a V-phase coil 10v and a W-phase coil 10w, and a rotor (not shown) having permanent magnets and mechanically coupled to driving wheels of the vehicle. First ends of these coils 10u, 10v and 10w are connected to a neutral point so that they are Y-connected.

The motor-generator 10 is connected to a battery as a DC power supply through the inverter 20. The output voltage of the battery 21 is higher than 100 V. Between the battery 21 and the inverter 20, there is disposed a smoothing capacitor 20 for smoothing the input voltage of the inverter 20. A voltage step-up converter may be disposed between the battery 21 and the inverter 20.

The inverter 20 includes three sets of series connections of upper arm switches Sup, Svp and Swp and lower arm switches Sun, Svn and Swn. The connection node between the upper arm and lower arm switches Sup and Sun of the U-phase is connected to a second end of the U-phase coil 10u through a U-phase bus bar 23u as a conductive member. The connection node between the upper arm lower arm switches Svp and Svn of the V-phase is connected to a second end of the V-phase coil 10v through a V-phase bus bar 23v. The connection node between the upper arm and lower arm switches Wup and Wun of the W-phase is connected to a second end of the W-phase coil 10w through a W-phase bus bar 23w. In this embodiment, as the switches SUp to SWn, voltage-controlled type semiconductor switching elements such as IGBTs are used. The switches SUp to SWp are parallel-connected with freewheel diodes DUp to DWn, respectively. The motor-generator 10 and the inverter 20 are housed in a common case (not shown).

The control system includes a U-phase current sensor 24u and a V-phase current sensor 24v for measuring currents flowing through the U-phase and V-phase of the motor-generator 10, respectively. The U-phase and V-phase current sensors 24u and 24v are mounted so as to be in contact with the U-phase and V-phase bus bars 23u and 23v, respectively. In this embodiment, the U-phase and V-phase current sensors 24u and 24v use a GMR (Giant Magneto Resistive) element for the purpose of reducing the size of these current sensors. Since the GMR element does not need a magnetic core with a coil, the size of these current sensors can be made smaller compared to conventional current sensors which use a Hall element that needs a magnetic core with a coil.

The control system includes a voltage sensor 25 for detecting the power supply voltage of the inverter 20 (the terminal voltage of the smoothing capacitor 22), and a rotation angle sensor (a resolver, for example) 26 for detecting the rotational angle (electrical angle θe) of the motor-generator 10. The control system further includes, as a temperature detecting section, a U-phase temperature sensor for detecting the temperature of the U-phase current sensor 24u.

The control unit 30, which is mainly constituted of a microcomputer, controls power supply to the inverter 20 to feedback the controlled variable (torque in this embodiment) of the motor-generator 10 to a command value (referred to as the command torque*hereinafter). Specifically, the control unit 30 generates manipulation signals gup to gwn corresponding to the switches Sup to Swp of the inverter 20 in accordance with detection values of the above described various sensors to on/off control these switches Sup to Swn. The manipulation signals gup, gvp and gwp corresponding to the upper arm switches Sup, Svp and Swp are in a complementary relationship with the manipulation signals gun, gvn and gwn corresponding to the lower arm switches Sun, Svn and Swn. That is, each of the upper arm switches Sup, Svp and Swp and a corresponding one of the lower arm switches Sun, Svn and Swn are turned on alternately with each other. The command torque Trq* is inputted to the control unit 30 from a higher control unit disposed outside the control unit 30.

Figure 2:
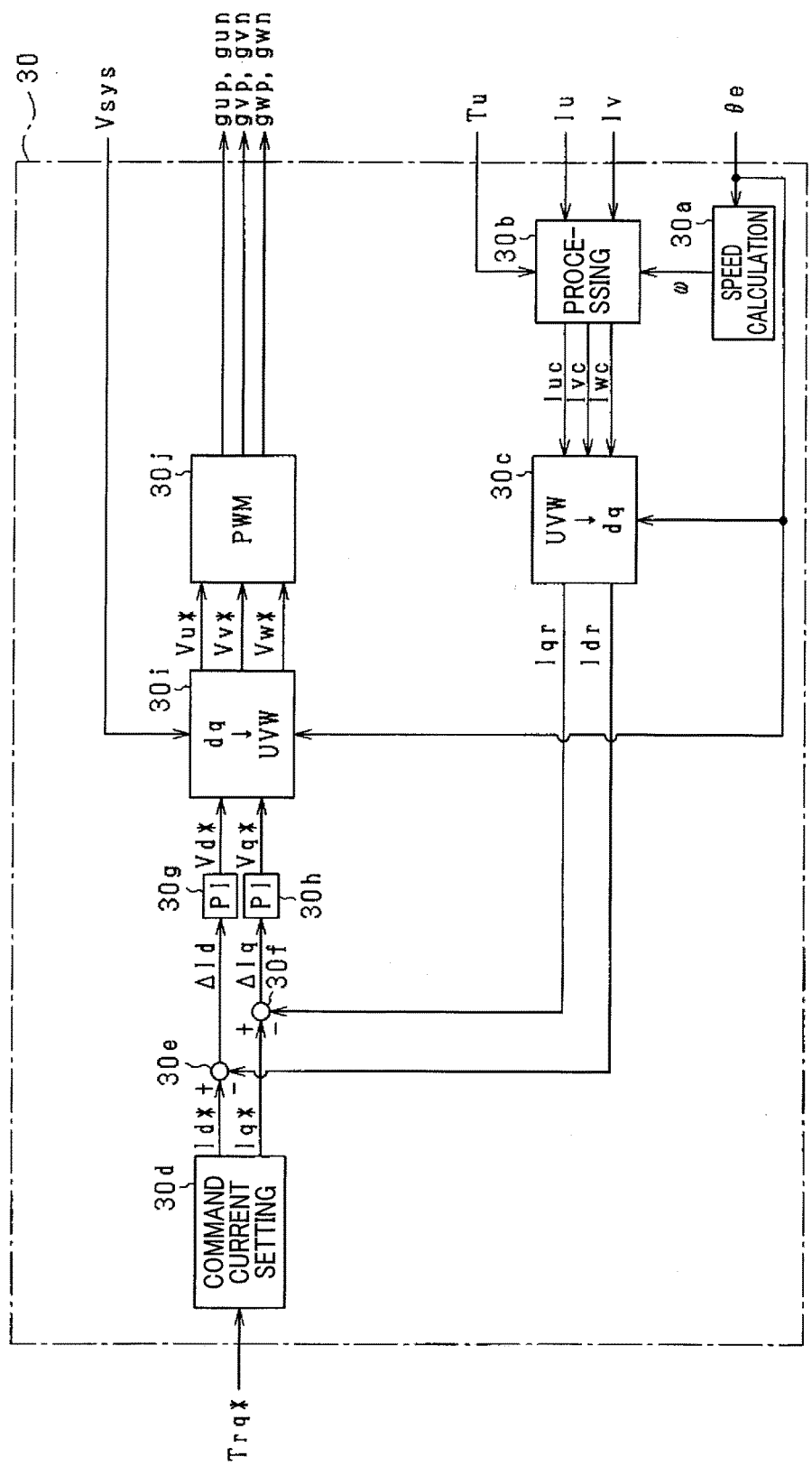
FIG. 2 is a block diagram showing a current feedback control process performed by the motor control system of the first embodiment.

Next, torque control (current feedback control in this embodiment) of the motor-generator 10 performed by the control unit 30 is explained with reference to FIG. 2.

A speed calculation section 30a calculates the electrical angular speed ω based on the electrical angle θe detected by the rotation angle sensor 26.

A processing section 30b temperature-compensates the U-phase current Iu detected by the U-phase current sensor 24u, and outputs the compensated U-phase current Iu (referred to as the U-phase compensated current value Iuc hereinafter) to a two-phase conversion section 30c. Also, the processing section 30b temperature-compensates the V-phase current Iv detected by the V-phase current sensor 24v, and outputs the compensated V-phase current Iv (referred to as the V-phase compensated current value Ivc hereinafter) to the two-phase conversion section 30c. Further, the processing section 30b calculates the W-phase compensated current value Iwc, and outputs it to the two-phase conversion section 30c.

The two-phase conversion section 30c converts the U-phase current, the V-phase current and the W-phase current in a three-phase fixed coordinate system into a d-axis current idr and a q-axis current Iqr in a two-phase rotary coordinate system (d-q coordinate system) based on the U-phase, V-phase and W-phase compensated current values Iuc, Ivc and Iwc.

A command current setting section 30 sets a d-axis command current Id* and a q-axis command current Iq* based on the command torque Trq*. A d-axis deviation calculation section 30e calculates a d-axis current deviation ΔId by subtracting the d-axis current Idr from the d-axis command current Id* set by the command current setting section 30. A q-axis deviation calculation section 30f calculates a q-axis current deviation ΔIq by subtracting the q-axis current Iqr from the q-axis command current Iq* set by the command current setting section 30.

A d-axis command voltage calculation section 30g calculates a d-axis command voltage Vd* as a manipulation amount for feedback-controlling the d-axis current Idr to the d-axis command current Id* based on the d-axis current deviation ΔId. More specifically, the d-axis command voltage calculation section 30g calculates the d-axis command voltage Vd* using proportional integral control whose input is the d-axis current deviation ΔId. A q-axis command voltage calculation section 30h calculates a q-axis command voltage Vq* as a manipulation amount for feedback-controlling the q-axis current Iqr to the q-axis command current Iq* based on the q-axis current deviation ΔIq.

A three-phase conversion section 30i converts the d-axis and q-axis command voltages Vd* and Vq* in the 2-phase rotary coordinate system into the U-phase, V-phase and W-phase command voltages Vu*, Vv* and Vw* in the three-phase fixed coordinate system based on the d-axis and q-axis command voltages Vd* and Vq*, the power supply voltage Vsys detected by the voltage sensor 25 and the electrical angle θe. In this embodiment, the U-phase, V-phase and W-phase command voltages Vu*, Vv* and Vw* have sinusoidal waveforms which are apart by 120 degrees in electrical angle from one another.

A manipulation signal generating section 30j generates the manipulation signals gup, gvp, gwp, gun, gvn and gwn based on the three-phase command voltages Vu*, Vv* and Vw*. In this embodiment, the manipulation signals gup, gvp, gwp, gun, gvn and gwn are generated using a PWM process based on comparison between a carrier signal (such as a triangular wave signal) and the three-phase command voltages Vu*, Vv* and Vw*. The manipulation signal generating section 30j outputs the manipulation signals gup, gvp, gwp, gun, gvn and gwn to the switches Sup, Svp, Swp, Sun, Svn and Swn. The manipulation signals may be generated using pulse patterns instead of the PWM processing.

Next, the processing section 30b is described. First, the reason why the control unit 30 is provided with the processing section 30b is explained.

Figure 3:
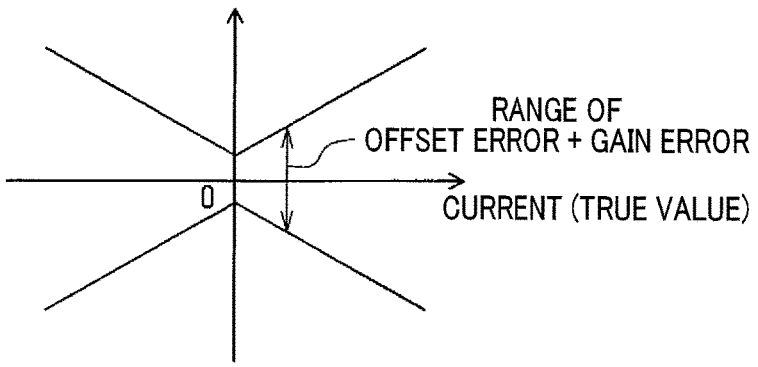
FIG. 3 is a diagram for explaining a current error.

The purpose of the provision of the processing section 30b is to avoid reduction of the torque controllability due to the current errors contained in the U-phase and the V-phase currents detected by the U-phase and V-phase current sensors 24u and 24v. As shown in FIG. 3, the current error includes an offset error and a gain error. The offset error is a deviation of the detected current from the actual value (true value) of the phase current, the deviation being constant irrespective of the actual value of the phase current. The gain offset is a deviation of the detected current from the actual value of the phase current, the deviation increasing with the increase of the actual value of the phase current. The offset error and the gain error depend on the temperature of the current sensor. More specifically, the absolute value of each of the offset error and the gain error increases as the temperature of the current sensor separates away from the reference temperature (25° C., for example) of the current sensor.

In this embodiment, the U-phase and the V-phase current sensors 24u and 24v are directly mounted on the U-phase and the V-phase bus bars 23u and 23v, respectively. The phase currents respectively flowing through the U-phase and the V-phase bus bars 23u and 23v cause the U-phase and the V-phase bus bars 23u and 23v to generate heat. Therefore, a temperature-dependent error is likely to occur in each of the U-phase and the V-phase currents Iu and Iv detected by the U-phase and the V-phase current sensors 24u and 24v. Accordingly, the deviations in value of U-phase and the V-phase currents Iu and Iv detected by the U-phase and the V-phase current sensors 24u and 24v from their actual values are likely to be large, causing the torque variation of the motor-generator 10 to occur.

Figure 4:
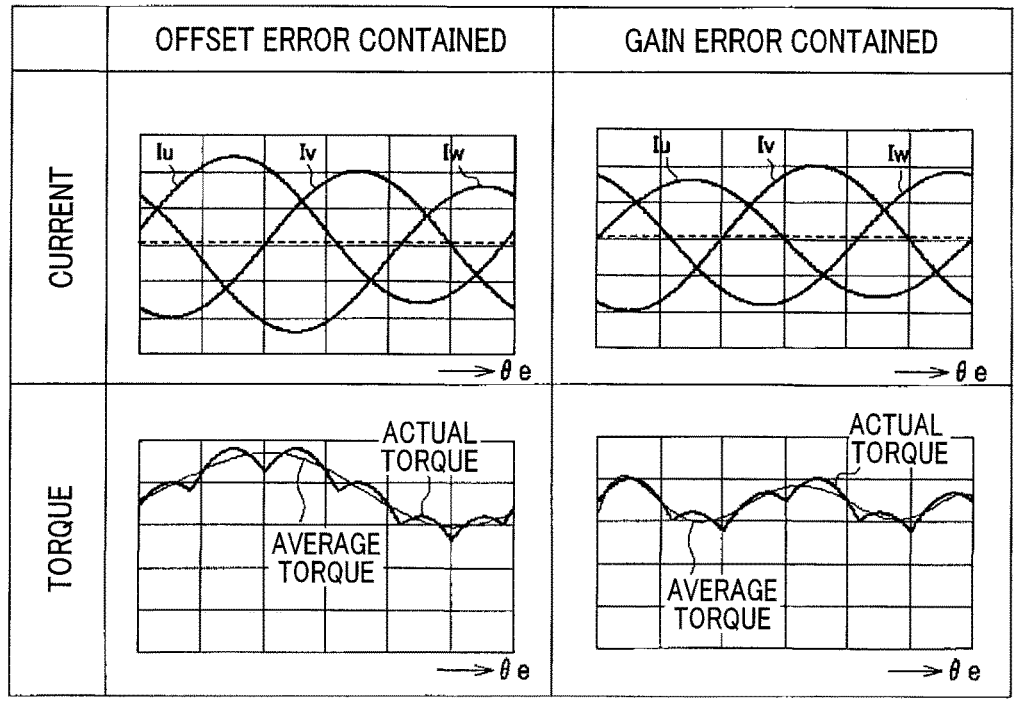
FIG. 4 is a diagram for explaining torque variation due to the current error.

For example, when the U-phase current Iu contains the offset error, the average torque of the motor-generator 10 varies with a period of 360 degrees in electrical angle as shown in FIG. 4. On the other hand, when the U-phase current Iu contains the gain error, the average torque of the motor-generator 10 varies with a period of 180 degrees in electrical angle. If the torque variation occurs, the vehicle vibrates causing the ride comfort of the vehicle to be worse.

To deal with this problem, the processing section 30b is provided in the control unit 30. In the following, a control process performed by the processing section 30b is explained with reference to FIGS. 5 to 9.

Figure 5:
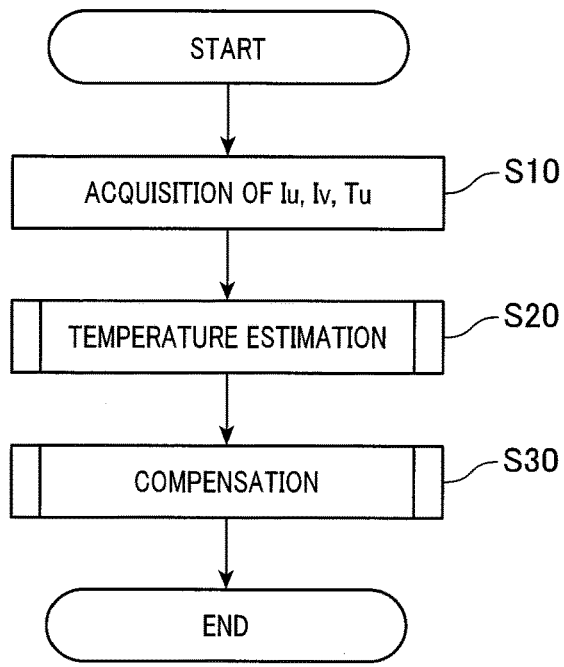
FIG. 5 is a flowchart showing steps of a control process performed by performed by the motor control system of the first embodiment.

FIG. 5 is a flowchart showing steps of the control process performed at regular time intervals by the processing section 30b.

This control process begins in step S10 where there are obtained the U-phase and the V-phase currents Iu and Iv detected by the U-phase and V-phase current sensors 24u and 24v, and the temperature detected by the U-phase temperature sensor 27u (this temperature being referred to as the U-phase temperature detection value Tu hereinafter). After completion of step S10, the control process proceeds to step S20 to perform a temperature estimation process, and thereafter proceeds to step S30 to perform a compensation process.

Figure 6:
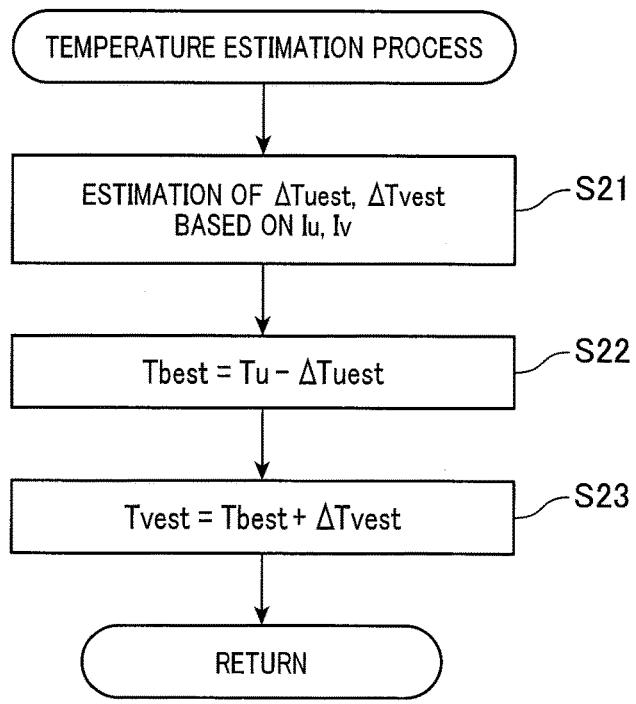
FIG. 6 is a flowchart showing steps of a temperature estimation process performed by the motor control system of the first embodiment.

FIG. 6 is a flowchart showing steps of the temperature estimation process.

This process begins in step S21 (a temperature increase estimation section) where the U-phase and V-phase temperature increase amounts ΔTuest and ΔTvest are estimated based on time-integrated values of the U-phase and V-phase currents Iu and Iv. The U-phase and V-phase temperature increase amounts ΔTuest and ΔTvest are amounts of increase of the temperatures of the U-phase and V-phase current sensors 24*u* and 24*v* due to the phase currents flowing through the U-phase and V-phase bus bars 23*u* and 23*v*, respectively. In this embodiment, the U-phase and V-phase temperature increase amounts ΔTuest and ΔTvest are given by the following equation eq1.

$$\Delta T\#est = \int_{t1}^{t2} K \cdot R \cdot I^2 \cdot dt \qquad \text{eq1}$$

$(\# = u, v)$

In the equation eq1, R denotes a resistance of the mounting portion of each of the U-phase and V-phase bus bars 23*u* and 23*v* for mounting the U-phase or V-phase current sensors 24*u* or 24*v*. I^2 denotes a root mean square value of the U-phase or V-phase current Iu or Iv, which is calculated from sampled values of the U-phase or V-phase current Iu or Iv. K denotes a coefficient used for converting the energy expressed by the equation of ∫R×I^2×dt (Ws) into an amount of the temperature increase. This coefficient depends on the material of the U-phase and V-phase bus bars 23*u* and 23*v*. The time interval from t1 to t2 in which I^2 is time-integrated is set shorter than one period of the phase current when the electrical angular speed ω is smaller than a later-explained threshold speed ωmin.

Figure 7:
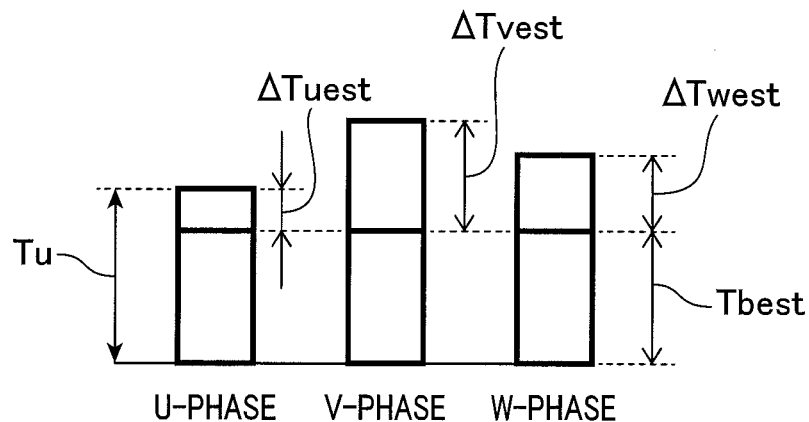
FIG. 7 is a diagram for explaining a temperature estimating method.

In subsequent step S22 (a reference temperature calculation section), a reference temperature Tbest is calculated by subtracting the U-phase temperature increase amount ΔTuest estimated in step S21 from the U-phase temperature detection value Tu. Subsequently, a V-phase temperature estimation value Tvest is calculated in step S23 (a temperature estimation section) by adding the V-phase temperature increase amount ΔTvest estimated in step S21 to the reference temperature Tbest. The reason why the V-phase temperature estimation value Tvest can be calculated as above is that since the ambient temperatures of the U-phase and V-phase current sensors 24*u* and 24*v* are approximately equal to each other, the reference temperature Tbest can be used as the common temperature corresponding to the ambient temperatures of the U-phase and V-phase current sensors 24*u* and 24*v* as shown in FIG. 7. Incidentally, FIG. 7 shows also the W-phase temperature increase amount ΔTwest in an assumption that the W-phase current sensor is mounted on the W-phase bus bar 23*w*.

Figure 8:
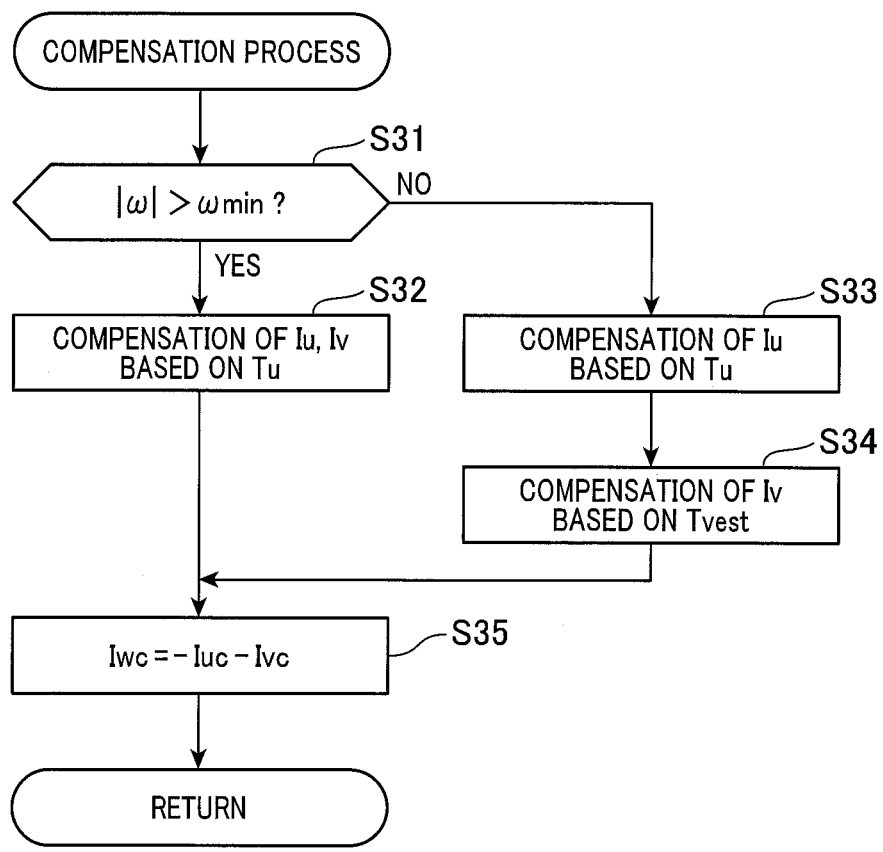
FIG. 8 is a flowchart showing steps of a temperature compensation process performed by the motor control system of the first embodiment.

Next, the compensation process is explained with reference to the flowchart of FIG. 8.

The compensation process begins in step S31 where it is determined whether or not the absolute value of the electrical angular speed ω calculated by the speed calculation section 30*a* is larger than the threshold speed ωmin (>0). Step S31 constitutes a speed determination section for determining whether or not the current situation is such that the time-averaged values of the respective phase currents differ greatly from one another and accordingly the increase amounts of the actual temperatures of the respective phases differ greatly from one another. The respective phase currents are sinusoidal currents whose phases are shifted from one another by 120 degrees in electrical angle. As shown in (a) of FIG. 9, the time-averaged values Iaveu, Iavev and Iavew of the respective phase currents in a specified time period tL are approximately equal to one another in the region where the electrical angular speed ω is high. This is because since a plurality of one-cycle waveforms are contained in the specified time period tL for each of the respective phase currents, the effect of the one-cycle waveform on the time-averaged value is small. For such reason, the increase amounts of the actual temperatures of the respective phases become approximately equal to one another, and accordingly the actual temperatures of the U-phase and V-phase current sensors 24*u* and 24*v* become approximately equal to each other. On the other hand, as shown in (b) FIG. 9, in the region where the electrical angular speed ω is low, the time-averaged values Iaveu, Iavev and Iavew of the respective phase currents in the specified time interval tL differ greatly from one another. This is because, since the one-cycle waveform of the respective phase currents extends outside the specified time period tL, there is deviation in value among the respective phase currents in the specified time period tL. As a result, the increase amounts of the actual temperatures of the respective phases differ greatly from one another, and accordingly, the actual temperatures of the U-phase and V-phase current sensors 24*u* and 24*v* differ from each other.

Returning to FIG. 8, if the determination result in step S31 is affirmative, the process proceeds to step S32 (a high speed rotation compensation section) where the U-phase and V-phase currents Iu and Iv are compensated into the U-phase and V-phase compensated current values Iuc and Ivc in accordance with the U-phase temperature detection value Tu to remove the current errors from the U-phase and V-phase currents Iu and Iv. The reason why the U-phase temperature detection value Tu can be used commonly for compensating the U-phase and V-phase currents Iu and Iv is that the actual temperature of the V-phase current sensor 24*v* is approximately equal to the actual temperature of the U-phase current sensor 24*u*. As described in the foregoing, in the region in which the electrical angular speed ω is high, the increase amounts of the actual temperatures of the U-phase and V-phase are approximately equal to each other. Accordingly, the actual temperature of the V-phase current sensor 24*v* becomes approximately equal to the U-phase temperature detection value Tu.

In this embodiment, the U-phase and V-phase currents Iu and Iv are compensated into U-phase and V-phase compensated current values Iuc and Ivc in accordance with temperature characteristics-data showing a relationship between the temperature of the current sensor and the current error obtained through experiment. Specifically, a current compensation value is calculated in accordance with the U-phase temperature detection value Tu and the temperature-characteristics data. The U-phase and V-phase currents Iu and Iv are compensated by the calculated current compensation value. The temperature-characteristics data may be divided into first temperature-characteristics data showing a relationship between the offset error and the temperature of the current sensor obtained through experiment and second temperature-characteristics data showing a relationship between the gain error and the temperature of the current sensor obtained through experiment On the other hand, if the determination result in step S31 is negative, since it means that the actual temperatures of the U-phase and V-phase current sensors 24*u* and 24*v* differ greatly from each other, the process proceeds to step S33. In step S33, the U-phase current Iu is compensated into the U-phase compensated current value Iuc based on the U-phase temperature detection value Tu and temperature-characteristics data. In subsequent step S34, the V-phase current Iv is compensated into the V-phase compensated current value Ivc based on the V-phase temperature estimation value Tvest and the temperature-characteristics data. Steps S33 and S34 constitute a low speed rotation compensation section.

After completion of steps S32 or S34, the process proceeds to step S35 where the W-phase compensated current value Iwc is calculated based on the U-phase and V-phase compensated current values Iuc and Ivc using Kirchhoff's law. The U-phase, V-phase and W-phase compensated current values Iuc, Ivc and Iwc are outputted to the two-phase conversion section 30c.

As explained above, in this embodiment, when the absolute value of the electrical angular speed ω is determined to be smaller than or equal to the threshold speed ωmin, the U-phase current Iu is compensated based on the U-phase temperature detection value Tu, and the V-phase current Iv is compensated based on the V-phase Temperature estimation value Tvest. As a result, the accuracy of detection of the phase currents used for the torque control can be increased.

On the other hand, when the absolute value of electrical angular speed ω is determined to be larger than the threshold speed min, the U-phase and V-phase currents Iu and Iv are compensated based on the common U-phase temperature detection value Tu. As a result, the accuracy of detection of the phase currents used for the torque control can be increased and the processing load of the control unit 30 can be reduced.

Second Embodiment

Figure 10:
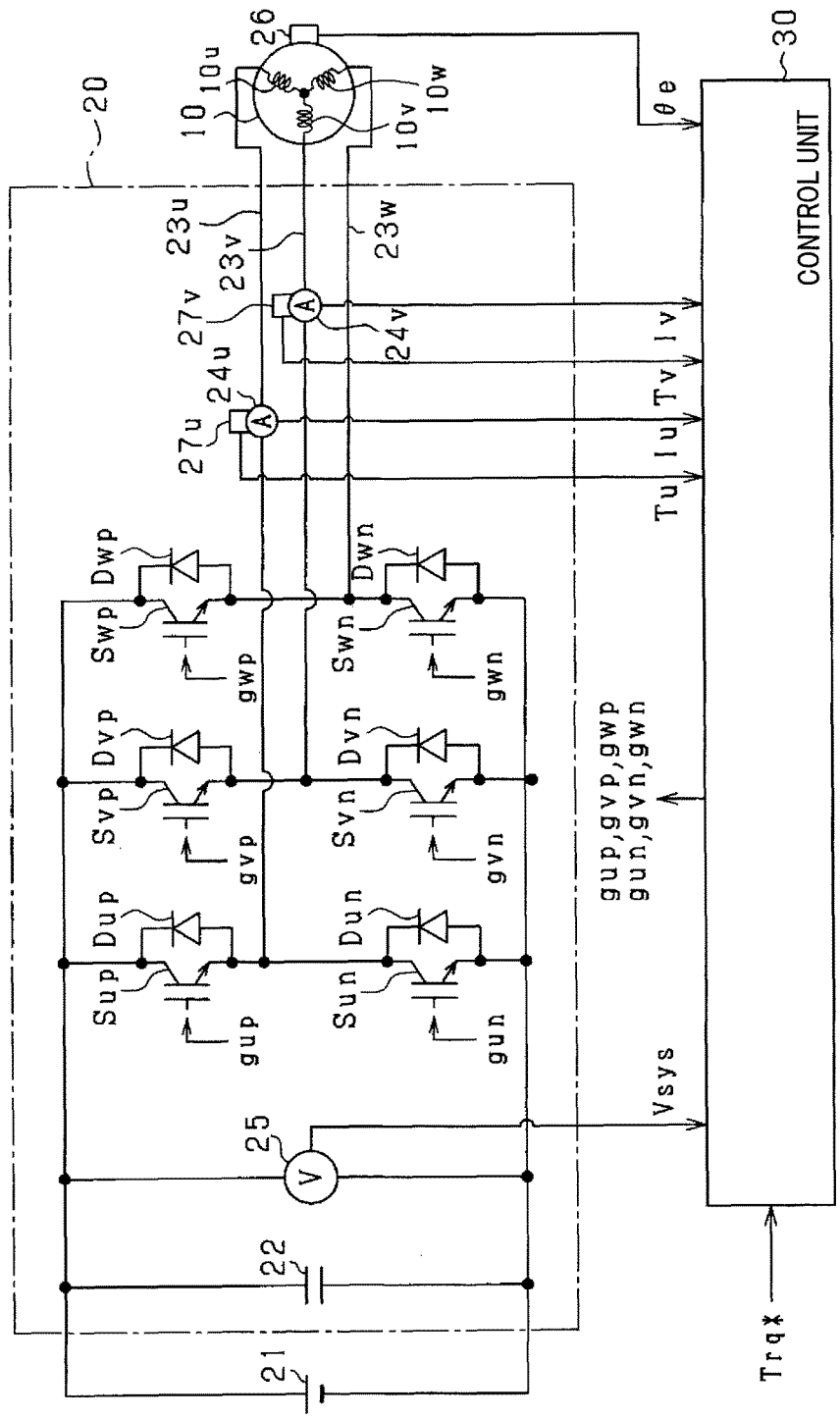
FIG. 10 is a diagram showing the overall structure of a motor control system as a second embodiment of the invention.

Next, a second embodiment of the invention is described with a focus on differences with the first embodiment. In the second embodiment, as shown in FIG. 10, the control system includes a V-phase temperature sensor 27v for detecting the temperature of the V-phase current sensor 24v in addition to the U-phase temperature sensor 27u. The temperature detected by the V-phase temperature sensor 27v (referred to as the V-phase temperature detection value Tv hereinafter) is inputted to the processing section 30b of the control unit 30.

In the following, processes performed by the processing section 30b in the second embodiment are explained. In this embodiment, even when one of the U-phase and V-phase temperature sensors 27u and 27v is abnormal, the temperature of the current sensor assigned to this abnormal temperature sensor is estimated based on the temperature detection value of the other normal temperature sensor.

Figure 11:
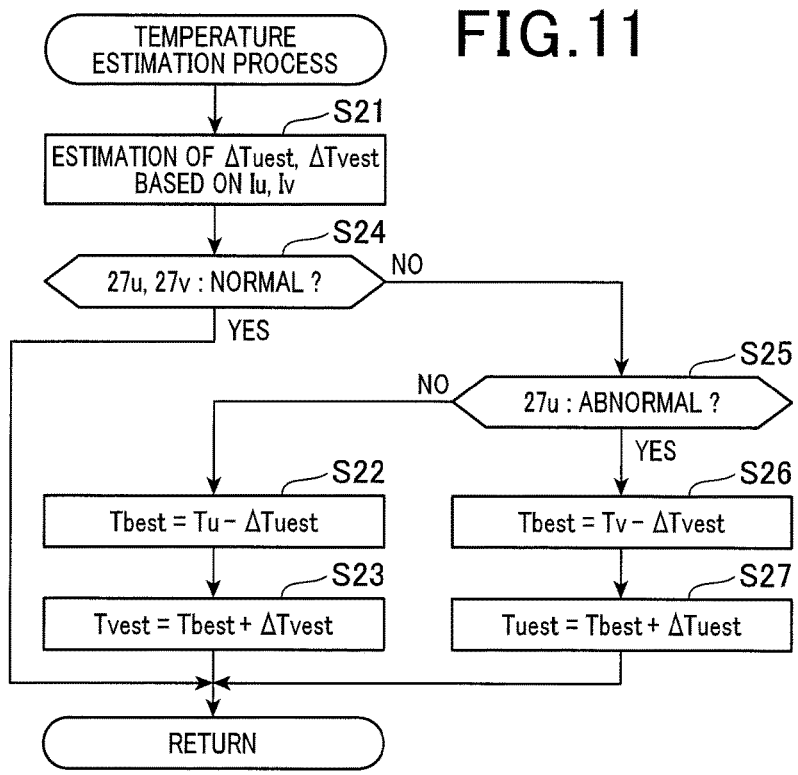
FIG. 11 is a flowchart showing steps of a temperature estimation process performed by the motor control system of the second embodiment.

FIG. 11 is a flowchart showing steps of a temperature estimation process performed in this embodiment. In FIG. 11, the steps which are the same as those shown in FIG. 6 are indicated by the same step numbers, respectively.

In this embodiment, after completion of step S21, the process proceeds to step S24 where it is determined whether or not both the U-phase and V-phase temperature sensors 27u and 27v are normal. Here, if the temperature detection value of the temperature sensor is within a range to be covered by this temperature sensor, this temperature sensor is determined to be normal. On the other hand, if the temperature detection value of this temperature sensor is outside the range to be covered by this temperature sensor, this temperature sensor is determined to be abnormal.

If the determination result is step S24 is negative, that is, if the U-phase temperature sensor 27u or the V-phase temperature sensor 27v is determined to be abnormal, the process proceeds to step S25. In step S25, it is determined, whether the U-phase temperature sensor 27u is abnormal or not. If the determination result in step S25 is negative, that is, if the V-phase temperature sensor 27v is determined to be abnormal, the process performs step S22 and step S23. Steps S24 and S25 constitute a temperature sensor abnormality determination section.

On the other hand if the determination result in step S25 is affirmative, that is, if the U-phase temperature sensor 27u is determined to be abnormal, the process proceeds to step S26. In step S26, the reference temperature Tbest is calculated by subtracting the V-phase temperature increase amount ΔTvest from the V-phase temperature detection value Tv. In subsequent step S27, the U-phase temperature estimation value Tuest is calculated by adding the U-phase temperature increase amount ΔTuest to the reference temperature Tbest.

Figure 12:
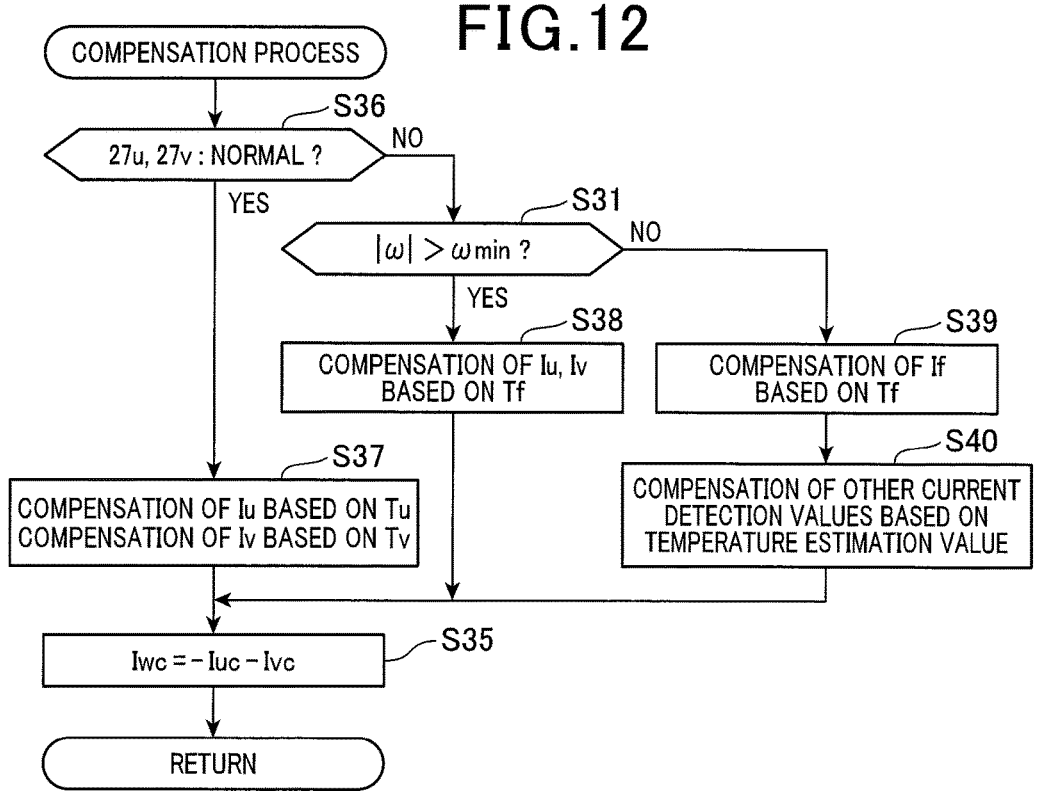
FIG. 12 is a flowchart showing steps of a temperature compensation process performed by the motor control system of the second embodiment.

Next, a temperature compensation process performed in this embodiment is explained with reference to the flowchart of FIG. 12. In FIG. 12, the steps which are the same as those shown in FIG. 8 are indicated by the same step numbers, respectively.

This process begins in step S36 where it is determined whether or not both the U-phase and V-phase temperature sensors 27u and 27v are normal. If the determination result in step S36 is affirmative, the process proceeds to step S37 where the U-phase current Iu is compensated into the U-phase compensated current value Iuc based on the U-phase temperature detection value Tu and temperature-characteristics data, and the V-phase current Iv is compensated into the V-phase compensated current value Ivc based on the V-phase temperature detection value Tv and temperature-characteristics data.

On the other hand, if the determination result in step S36 is negative, the process proceeds to step S31 to determine whether or not the absolute value of electrical angular speed ω is larger than the threshold speed ωmin. If the determination result in step S31 is affirmative, the process proceeds to step S38 where the U-phase and V-phase currents Iu and Iv are compensated into the the U-phase and V-phase compensated current values Iuc and Ivc, respectively based on the temperature detection value detected by the normal one of the U-phase and V-phase temperature sensors 27u and 27v (this temperature detection value being referred to as the normal temperature detection value Tf hereinafter) and the temperature-characteristics data.

On the other hand, if the determination result in step S31 is negative, the process proceeds to step S39 to compensate the current detection value If detected by the normal one of the U-phase and V-phase temperature sensors 27u and 27v and the temperature-characteristics data. In subsequent step S40, the current detection value detected by the abnormal one of the U-phase and V-phase temperature sensors 27u and 27v is compensated based on the temperature estimation value calculated in step S23 or S27.

For example, if the U-phase temperature sensor 27u has been determined to be abnormal, the V-phase current Iv is compensated into the V-phase compensated current value Ivc based on the V-phase temperature detection value Tv and the temperature-characteristics data in step S39. Subsequently, the U-phase current Iu is compensated into the U-phase compensated current value Iuc in step S40 based on the U-phase temperature estimation value Tuest calculated in step S27 and the temperature-characteristics data. After completion of step S37, S38 or S40, the process proceeds to step S35.

According to the second embodiment described above, even if one of the U-phase and V-phase temperature sensors 27u and 27v has failed, it is possible to estimate the temperature of the current sensor assigned to this failed temperature sensor as a fail-safe measure. Hence, according to this embodiment, even if one of the U-phase and V-phase temperature sensors 27u and 27v has failed, it is possible to prevent degradation of the torque controllability.

Third Embodiment

Figure 13:
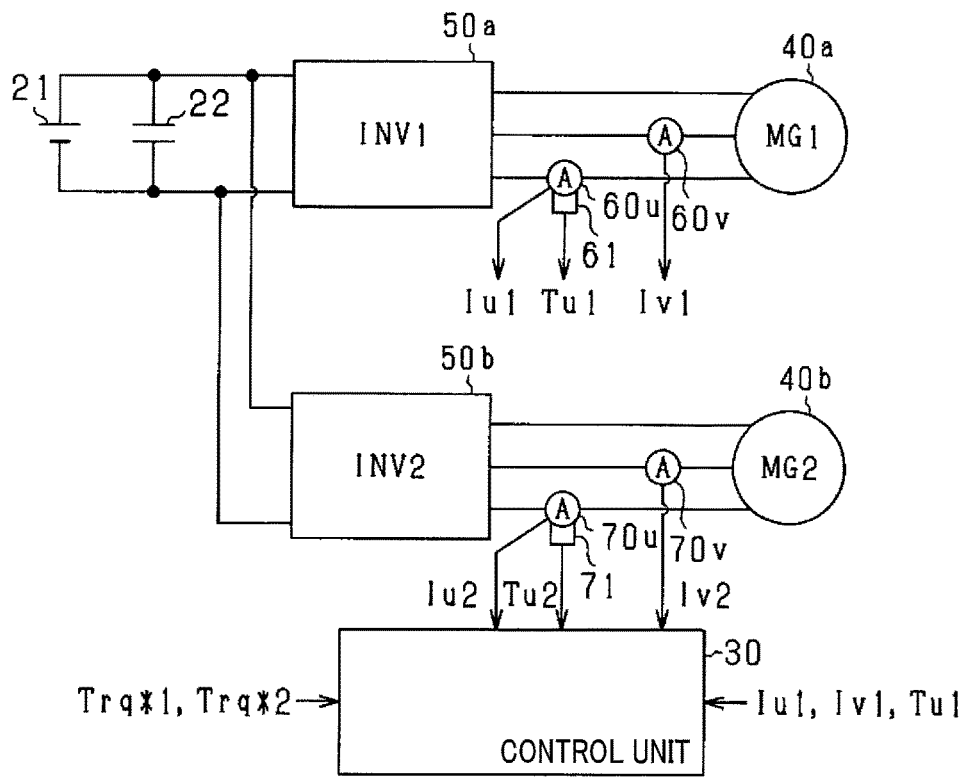
FIG. 13 is a diagram showing the overall structure of a two-motor control system as a third embodiment of the invention.

Next, a third embodiment of the invention is described with a focus on differences with the first embodiment. In the third embodiment, as shown in FIG. 13, the control system is for a two-motor system. In FIG. 13, the components which are the same as those shown in FIG. 1 are indicated by the same reference characters, respectively.

As shown in FIG. 13, in this embodiment, the control system includes a first motor-generator 40a, a second motor-generator 40b, a first inverter 50a and a second inverter 50b. The first and second motor-generators 40a and 40b are the same in structure as the motor-generator 10 described in the first embodiment. The first motor-generator 40a functions as an alternator and a starter for applying an initial rotation to the crankshaft of the vehicle main engine. The second motor-generator 40b functions as the vehicle main engine as in the case of the first embodiment.

The first motor-generator 40a is connected to the battery 21 through the first inverter 50a. The second motor-generator 40b is connected to the battery 21 through the second inverter 50b.

The control system includes first U-phase and V-phase current sensors 60u and 60v for detecting the currents respectively flowing through the U-phase and the V-phase of the first motor-generator 40a, and a first U-phase temperature sensor 61 for detecting the temperature of the first U-phase current sensor 60u. The control system further includes second U-phase and V-phase current sensors 70u and 70v for detecting the currents respectively flowing through the U-phase and the V-phase of the second motor-generator 40b, and a second U-phase temperature sensor 71 for detecting the temperature of the second U-phase current sensor 70u. In FIG. 13, rotation angle sensors for detecting the rotational angles of the motor-generators 40a and 40b, and voltage sensors for detecting the power supply voltages of the inverters 50a and 50b are omitted from illustration.

The control unit 30 manipulates supply of power to the first inverter 50a to feedback-control the torque of the first motor-generator 40a to a first command torque Trq*1, and manipulates supply of power to the second inverter 50b to feedback-control the torque of the second motor-generator 40b to a second command torque Trq*2. The manipulation of supply of power to each of the first and second inverters 50a and 50b is performed as current feedback control such as shown in FIG. 2. In this embodiment, the processing section 30b of the control unit 30 is supplied with the detection values of the first U-phase current sensor 60u, the first V-phase current sensor 60v, the first U-phase temperature sensor 61, the second U-phase current sensor 70u, the second V-phase current sensor 70v and the second U-phase temperature sensor 71.

Next, processes performed by the processing section 30b in the third embodiment are explained. In this embodiment, even if one of the first and second U-phase temperature sensors 61 and 71 has failed, the temperature of the current sensor assigned to this failed temperature sensor is estimated based on the temperature detection value detected by the other normal temperature sensor as a fail-safe measure. To this end, the processing section 30b performs a learning process in addition to the temperature estimating process.

Figure 14:
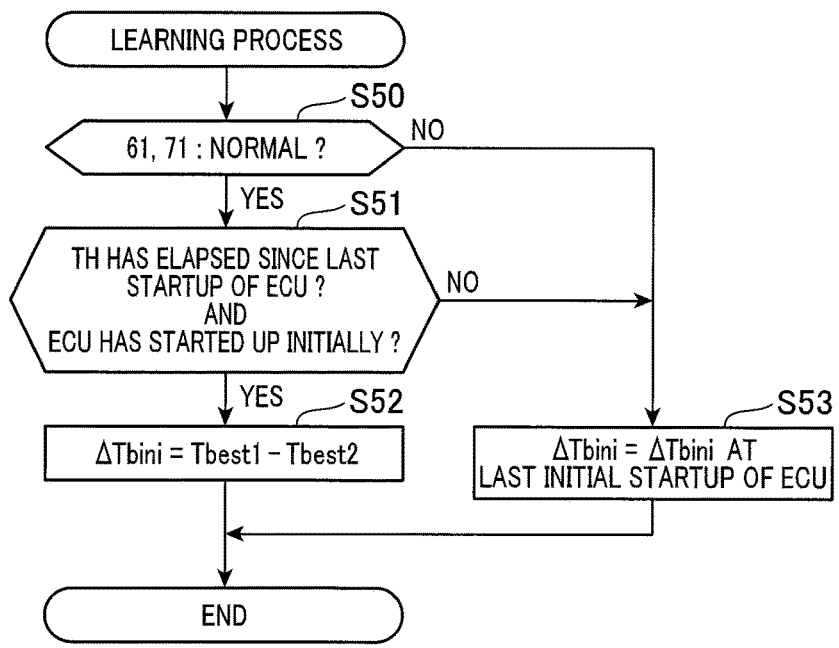
FIG. 14 is a flowchart showing steps of an initial deviation learning process performed by the two-motor control system of the third embodiment.

FIG. 14 shows steps of the learning process performed at regular time intervals by the processing section 30b.

This process begins in step S50 where it is determined whether or not both the first U-phase temperature sensor 61 and the second U-phase temperature sensor 71 are normal.

If the determination result in step S50 is affirmative, the process proceeds to step S51 where it is determined whether or not the logical product between the condition that a predetermined time TH has elapsed since the control unit 30 was started last time and the condition that the control unit 30 has been initially started up is true. Step S51 constitutes a second state-determination section for determining whether or not the first and second U-phase temperature sensors 61 and 71 are in the thermal equilibrium state with their surroundings.

If the determination result in step S51 is affirmative, the process proceeds to step S52 where the initial deviation ΔTbini is calculated by subtracting a second reference temperature Tbest2 from a first reference temperature Tbest1. The first reference temperature Tbest1 can be calculated by subtracting a temperature increase amount ΔTuest1 of the first U-phase temperature sensor 61 from the temperature detected by the first U-phase temperature sensor 61 (this temperature being referred to as the first U-phase temperature detection value Tu1 hereinafter). The temperature increase amount ΔTuest1 of the first U-phase temperature sensor 61 can be estimated by a procedure similar to the procedure of step S21 shown in FIG. 6. The second reference temperature Tbest2 can be calculated by subtracting a temperature increase amount ΔTuest2 of the second U-phase temperature sensor 71 from the temperature detected by the second U-phase temperature sensor 71 (this temperature being referred to as the second U-phase temperature detection value Tu2 hereinafter). The temperature increase amount ΔTuest2 of the second U-phase temperature sensor 71 can be estimated by a procedure similar to the procedure of step S21 shown in FIG. 6. The calculated initial deviation ΔTbini is stored in a not shown storage (memory) of the control unit 30. Incidentally, the initial deviation ΔTbini may take a value other than 0 depending on difference in mounting position or aged deterioration between the first and second U-phase temperature sensors 61 and 71.

On the other hand, if the determination result in step S50 or S51 is negative, the process proceeds to step S53 where the initial deviation ΔTbini stored in the storage at the time of the previous initial startup of the control unit 30 is used as the initial deviation ΔTbini.

Next, the temperature estimation process performed in this embodiment is explained with reference to the flowchart of FIG. 15. Here, it is assumed that the first U-phase temperature sensor 61 has failed.

This process begins in step S60 where the first U-phase temperature increase amount ΔTuest1 is estimated based on a first U-phase current Iu1 detected by the first U-phase current sensor 60u, and a first V-phase temperature increase amount ΔTvest1 is estimated based on the first V-phase current Iv1 detected by the first V-phase current sensor 60v. Further, the second U-phase temperature increase amount ΔTuest2 of the second U-phase current sensor 70u is estimated based on a second U-phase current Iu2 detected by the second U-phase current sensor 70u.

In subsequent step S61, the first reference temperature Tbest1 is calculated by subtracting the first U-phase temperature increase amount ΔTuest1 from the first U-phase temperature detection value Tu1, and the second reference temperature Tbest2 is calculated by subtracting the second U-phase temperature increase amount ΔTuest2 from the second U-phase temperature detection value Tu2.

In subsequent step S62 (a second abnormality determination section), it is determined whether or not the first U-phase temperature sensor 61 is normal. If the determination result in step S62 is affirmative, the process proceeds to step S63 where the temperature estimation value of the first V-phase current sensor 60v (referred to as the first V-phase temperature estimation value Tvest1 hereinafter) by adding the first V-phase temperature increase amount ΔTvest1 to the first reference temperature Tbest1.

On the other hand, if the determination result in step S62 is negative, the process proceeds to step S64 where the first reference temperature Tbest1 is updated by adding the initial deviation ΔTbini learned in steps S51 and S53 of the learning process to the second reference temperature Tbest2.

In subsequent step S65, the temperature estimation value of the first U-phase current sensor 60v (referred to as the first U-phase temperature estimation value Tuest1 hereinafter) is calculated by adding the first U-phase temperature increase amount ΔTuest1 to the updated first reference temperature Tbest1. Further, the first V-phase temperature estimation value Tvest1 is calculated by adding the first V-phase temperature increase amount ΔTvest1 to the updated first reference temperature Tbest1.

Figure 15:
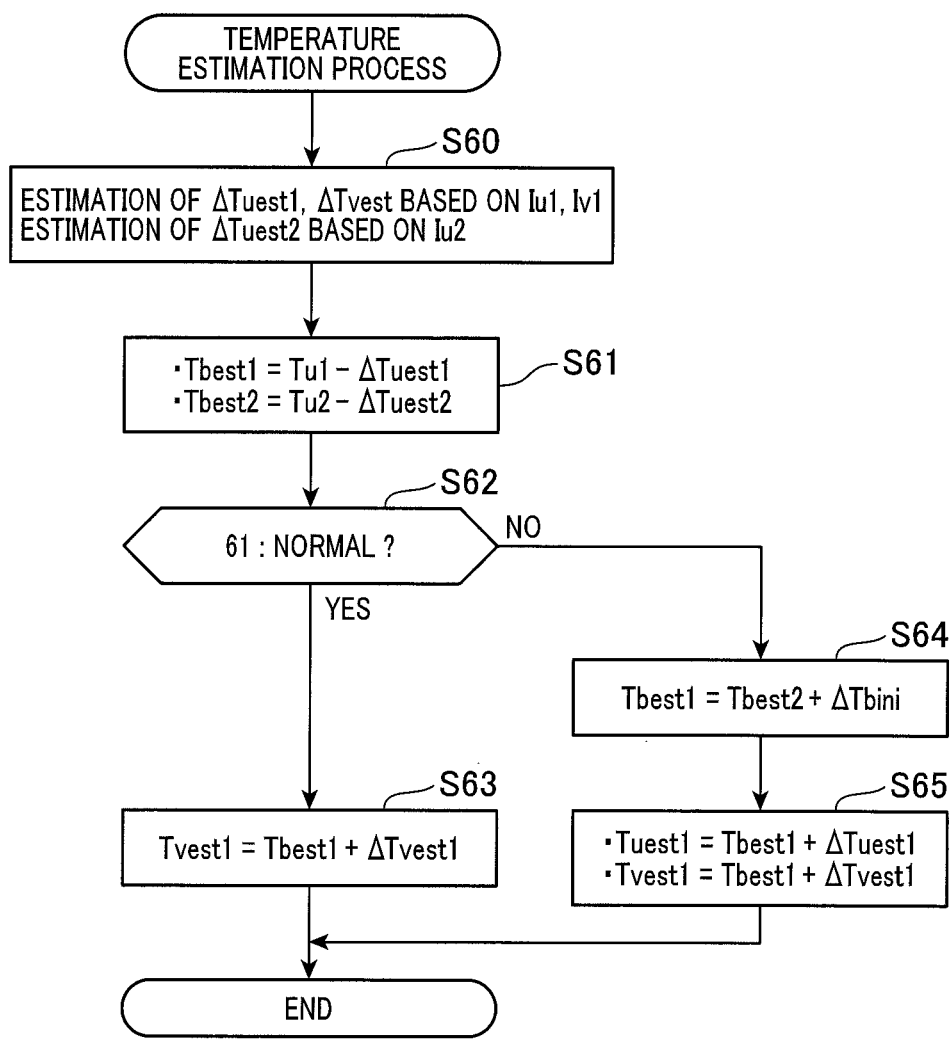
FIG. 15 is a flowchart showing steps of a temperature estimation process performed by the two-motor motor control system of the third embodiment.

Incidentally, it is possible to estimate the temperatures of the second U-phase and V-phase current sensors 70u and 70v by a process similar to the process shown in FIG. 15 also when the second U-phase temperature sensor 71 has failed. In this case, it is determined in step S62 whether or not the second U-phase temperature sensor 71 is normal.

According to the third embodiment described above, even when one of the first and the second U-phase temperature sensors 61 and 71 provided corresponding to the two currents sensors of the two motor-generators has failed, it is possible to estimate the temperatures of the currents sensors as a fail-safe measure. Therefore, it is possible to prevent reduction of the torque controllability.

The third embodiment can be used also for a control system including three or more sets of motor-generators and inverters. For example, when the third embodiment is used for a control system including three sets of motor-generators and inverters, one of the three sets corresponds to a first system, and one of the other two sets corresponds to a second system.

Fourth Embodiment

Figure 16:
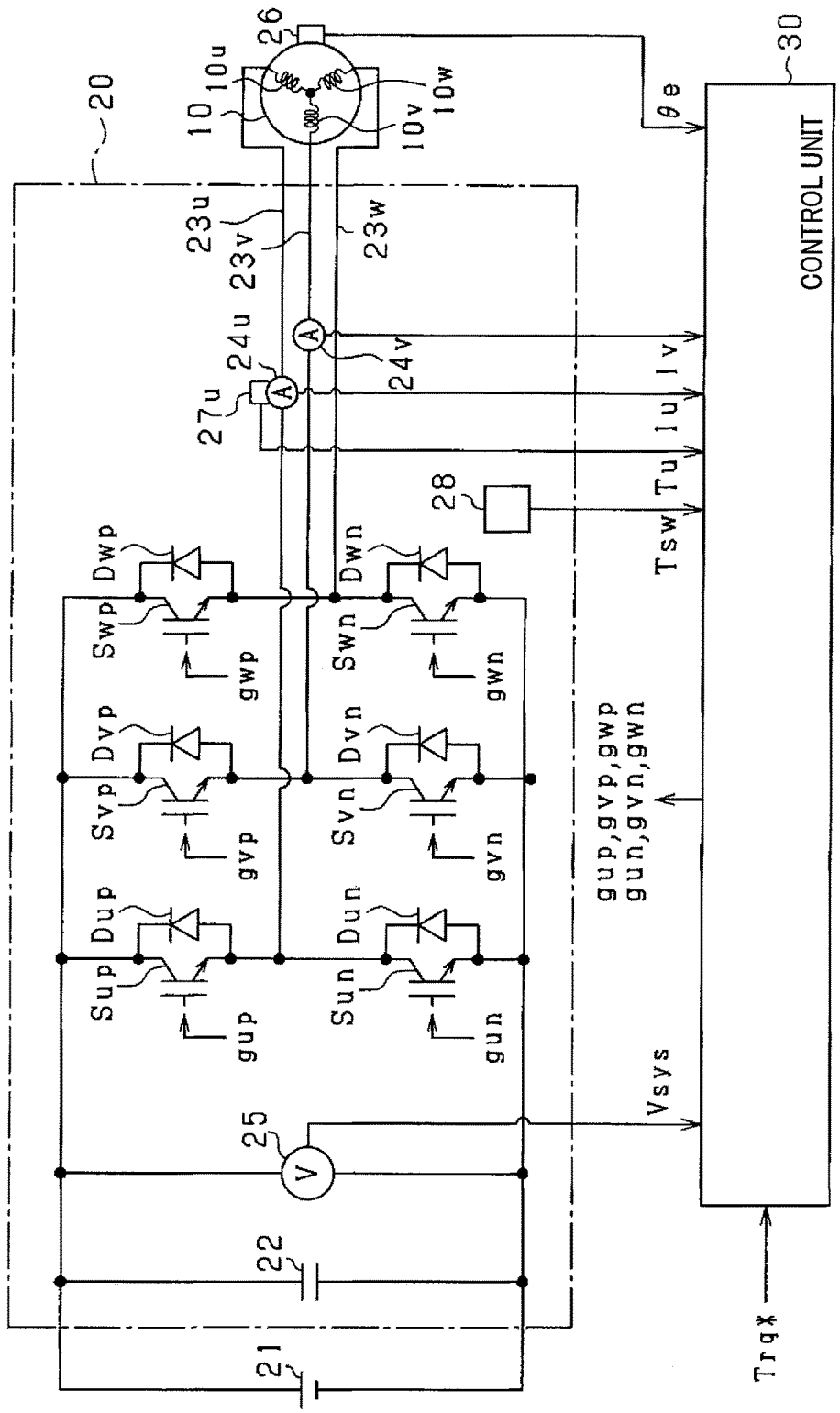
FIG. 16 is a diagram showing the overall structure of a motor control system as a fourth embodiment of the invention.

Next, a fourth embodiment of the invention is described with a focus on differences with the first embodiment. In this embodiment, as shown in FIG. 16, the inverter 20 is provided with a switch-temperature sensor 28 for detecting the temperature of at least one of the switches Sup to Swn constituting the inverter 20. The switch-temperature sensor 28 is for protecting the switches Sup to Swn from overheat. The processing section 30b of the control unit 30 receives the temperature detected by the switch-temperature sensor 28 (referred to as the switch-temperature Tsw hereinafter). The control unit 30 forcibly reduces the command torque Trq*, or forcibly stops the driving of the switches Sup to Swn upon determining that the switch-temperature Tsw exceeds a threshold temperature. In FIG. 16, the components which are the same as those shown in FIG. 1 are indicated by the same reference characters, respectively.

Next, processes performed by the processing section 30b in this embodiment are explained. In this embodiment, even when the U-phase temperature sensor 27u has failed, the temperatures of the U-phase and V-phase current sensors 24u and 24v are estimated based on the switch-temperature Tsw.

Figure 17:
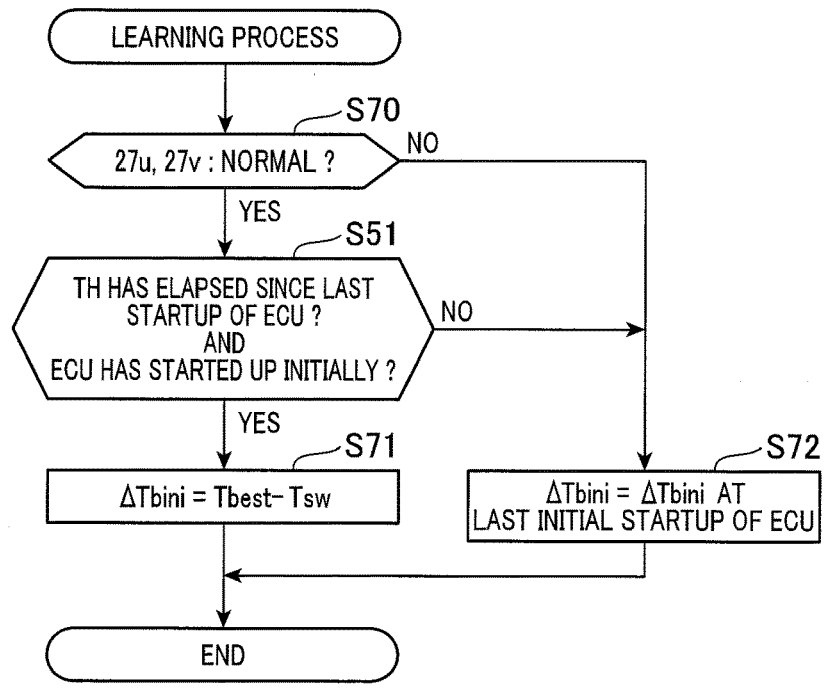
FIG. 17 is a flowchart showing steps of an initial deviation learning process performed by the motor control system of the fourth embodiment.

FIG. 17 shows steps of a learning process (a first learning section) performed at regular time intervals by the processing section 30b. In FIG. 17, the steps which are the same as those shown in FIG. 14 are indicated by the same step numbers, respectively.

This process begins in step S70 where it is determined whether or not both the U-phase temperature sensor 27u and the SW temperature sensor 28 are normal.

If the determination result in step S70 is affirmative, the process proceeds to step S51 (a first state-determination section). If the determination result in step S51 is affirmative, the process proceeds to step S71 where the initial deviation ΔTbini is calculated by subtracting the switch-temperature Tsw from the reference temperature Tbest. The calculated initial deviation ΔTbini is stored in the storage of the control unit 30.

On the other hand, if the determination result in step S70 or S51 is negative, the process proceeds to step S72 where the initial deviation ΔTbini stored in the storage at the time of the previous initial startup of the control unit 30 is set as the initial deviation ΔTbini.

Figure 18:
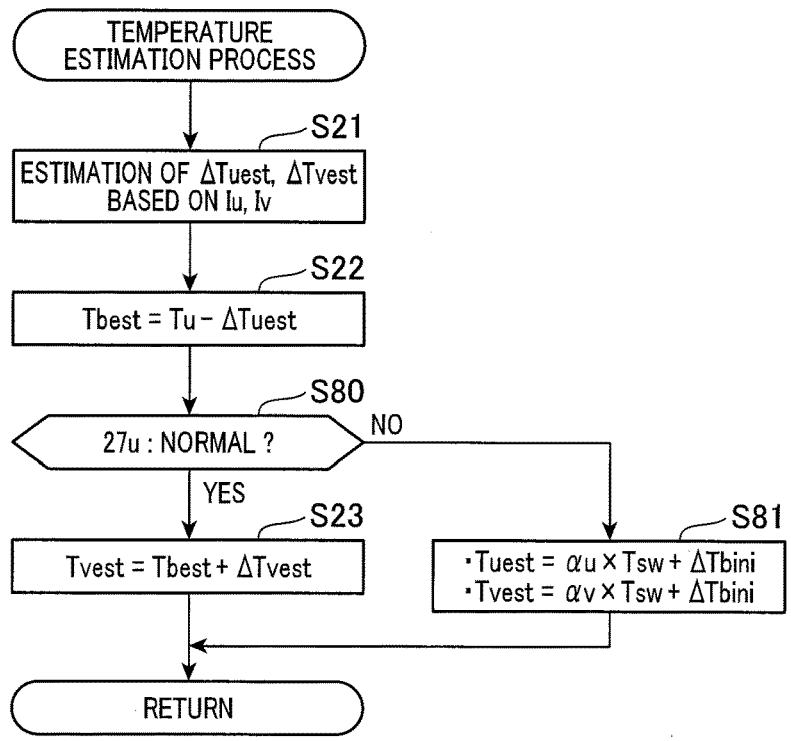
FIG. 18 is a flowchart showing steps of a temperature estimation process performed by the motor control system of the fourth embodiment.

Next, the temperature estimation process performed in this embodiment is explained with reference to the flowchart of FIG. 18. In FIG. 18, the steps which are the same as those shown in FIG. 6 are indicated by the same step numbers, respectively.

In this embodiment, after completion of steps S21 and S22, the process proceeds to step S80 (a first abnormality determination section) where it is determined whether or not the U-phase temperature sensor 27u is normal. If the determination result in step S80 is affirmative, the process proceeds to step S23 to calculate the V-phase temperature estimation value Tvest.

On the other hand, if the determination result in step S80 is negative, the process proceeds to step S81 where the U-phase and V-phase temperature estimation values Tuest and Tvest are calculated based on the initial deviation ΔTbini learned in step S71 or S72 of the learning process and the switch-temperature Tsw. In this embodiment, the U-phase and V-phase temperature estimation values Tuest and Tvest are given by the following equation eq2.

$$T\#\text{est} = \alpha\# \times T\text{sw} + \Delta T\text{bini} \qquad \text{eq2}$$

(#=u,v)

In the equation 2, alphau and alphav are compensation coefficients defining relationships between the switch-temperature Tsw and the U-phase and V-phase temperature detection values Tu and Tv, which can be obtained through experiment.

According to the fourth embodiment, when the U-phase temperature sensor 27u has failed, it is possible to estimate the temperatures of the U-phase and V-phase current sensors 24u and 24v based on the switch-temperature Tsw as a fail-safe measure. Therefore, it is possible to prevent reduction of the torque controllability.

The fourth embodiment can be used also for a control system including two or more sets of motor-generators and inverters.

Fifth Embodiment

Next, a fifth embodiment of the invention is described with a focus on differences with the first embodiment. In the fifth embodiment, the content of step S31 shown in FIG. 8 is changed.

Figure 19:
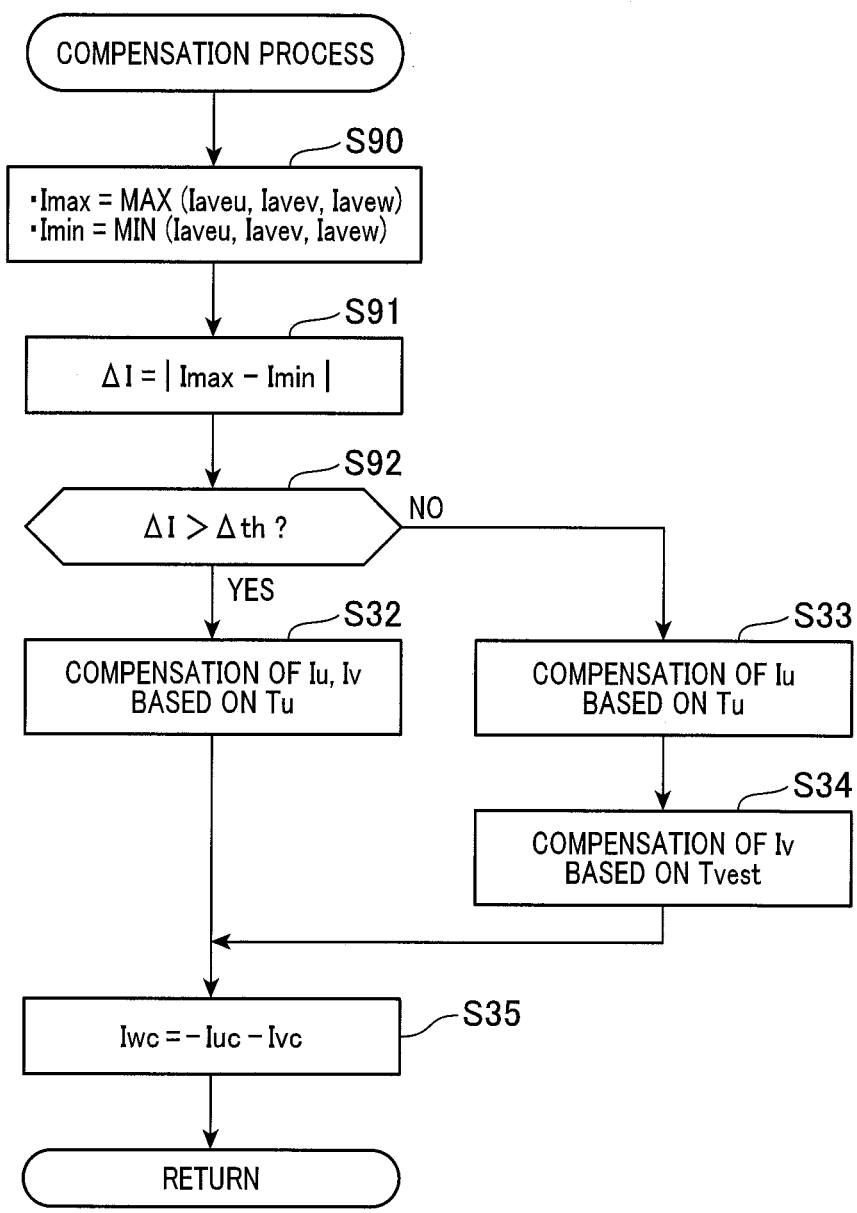
FIG. 19 is a flowchart showing steps of a temperature compensation process performed by a motor control system as a fifth embodiment of the invention.

FIG. 19 shows steps of the compensation process performed in this embodiment. This process is performed at regular time intervals by the processing section 30b. In FIG. 19, the steps which are the same as those shown in FIG. 8 are indicated by the same step numbers, respectively.

Figure 9:
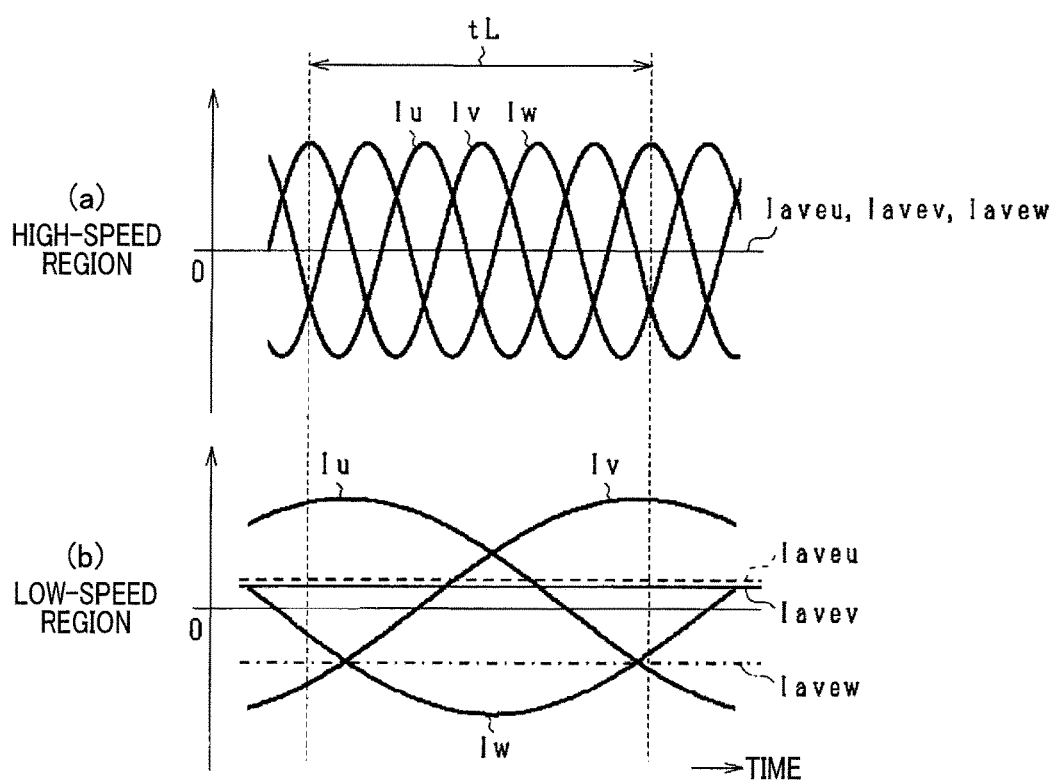
FIG. 9 is a time chart for explaining a relationship between the rotational speed and phase currents of a motor-generator.

This process begins in step S90 (a determination value calculation section) where time-averaged values Iaveu, Iavev and Iavew of the U-phase, V-phase and W-phase currents Iu, Iv and Iw are calculated (see FIG. 9). Further, a maximum value Imax and a minimum value Imin are extracted from the calculated time-averaged values Iaveu, Iavev and Iavew.

In subsequent step S91 (a deviation calculation section), the absolute value of the difference between the maximum value Imax and the minimum value Imin is calculated as a determination deviation $\Delta I$.

In subsequent step S92, it is determined whether or not the determination deviation $\Delta I$ is larger than a specified value $\Delta th$ (>0). The purpose of step S91 is the same as that of step S31. When the determination deviation $\Delta I$ is large, the current situation is such that the electrical angular speed is in the low speed region explained with reference to (b) of FIG. 9. When the determination deviation $\Delta I$ is small, the current situation is such that the electrical angular speed is in the high speed region explained with reference to (a) FIG. 9. If the determination result in step S92 is affirmative, that is, if the electrical angular speed is determined to be in the high speed region, the process proceeds to step S32. On the other hand, if the determination result in step S92 is negative, that is, if the electrical angular speed is determined to be in the low speed region, the process proceeds to step S33.

According to the fifth embodiment, advantages similar to the advantages provided by the first embodiment can be provided.

Incidentally, the content of step 31 shown in FIG. 12 can be changed to the contents of steps S90 to S92.

Other Embodiments

It is a matter of course that various modifications can be made to the above described embodiments as described below.

The first embodiment may be modified to include three current sensors for detecting three phase currents flowing through the three phases of the motor-generator. In this case, three temperature sensors may be disposed corresponding to the three current sensors. Also in this case, the temperature estimation process and the compensation process described in the first embodiment can be used when one or two of the three temperature sensors have failed.

In the fourth embodiment, if the initial deviation $\Delta Tbini$ is 0 or approximately 0, the initial deviation $\Delta Tbini$ may be neglected in equation eq2.

In step S90 in FIG. 19 of the fifth embodiment, the maximum value and the minimum value may be calculated using the root mean square values of the respective phase currents instead of using the time-averaged values of the respective phase currents.

In the first embodiment, the torque control is performed as current feedback control. However, the torque control may be performed as torque feedback control. In this case, the phase of a voltage vector of the inverter in the d-q coordinate system is calculated as a manipulation amount for feedback-controlling the torque of the motor-generator which is estimated based on the d-axis and q-axis currents to the command torque. Based on the calculated phase, the manipulation signals gup to qwn are generated.

The current sensor may be or may not be of the type that includes a shunt resistor. In the above embodiment, the current sensor is directly mounted on the bus bar. However, the current sensor may be of the type that includes a Hall element. In this case, the current sensor can detect the phase current without being in contact with the bus bar.

The controlled variable of the motor-generator does not necessary have to be torque. It may be rotational speed. In the above embodiments, the motor-generator is of the salient-pole type. However, it may be of the non-salient pole type. The motor-generator does not necessary have to be a permanent-magnet type synchronous machine. It may be a field-winding synchronous machine. The moto-generator may not be of the synchronous type machine.

The present invention can be used other than a vehicle.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for use in a control system which includes a power conversion circuit for applying an AC voltage to a three-phase electric rotating machine in accordance with power supplied, current sensors provided corresponding to at least two of three phases of the electric rotating machine to detect phase currents of the electric rotating machine, and a temperature sensor provided corresponding to at least one of the current sensors for detecting temperature of the current sensor, a first current sensor being one of the current sensors, a temperature of the first current sensor being detected by one temperature sensor of the temperature sensors, a second current sensor being one of the current sensors other than the first current sensor, the control apparatus comprising:

a controller configured to act as:

a temperature increase amount estimation section that estimates, for each of all the current sensors, an amount of temperature increase of the current sensors due to a current flowing through the phase in which the current sensor is provided based on a current flowing through the current sensor;

a reference temperature calculation section that calculates a reference temperature by subtracting the temperature increase amount of the first current sensor from a temperature detection value of the temperature sensor;

a temperature estimation section that estimates temperature of the second current sensor by adding the reference temperature to the temperature increase amount of the second current sensor;

a speed determination section that determines whether a rotational speed of the electric rotating machine is in a high speed region higher than a threshold speed or in a low speed region lower than or equal to the threshold speed;

a low speed rotation compensation section that compensates a current detection value of the first current sensor based on the temperature detection value of the temperature sensor, and compensates the current detection value of the second current sensor based on the temperature of the second current sensor estimated by the temperature estimation section on condition that the rotational speed is determined to be in the low speed region by the speed determination section;

a high speed rotation compensation section that compensates a current detection value of each of all the current sensors based on the temperature detection value of each temperature sensor without using the temperature of the non second current sensor estimated by the temperature estimation section on condition that the rotational speed is determined to be in the high speed region by the speed determination section; and a control section that controls a controlled variable of the electric rotating machine by manipulating supply of power to the power conversion circuit using the compensated current detection value of each current sensor.

2. The control apparatus according to claim 1, wherein the temperature sensor is provided corresponding to one of all the current sensors.

3. The control apparatus according to claim 1, wherein
the temperature sensors are provided corresponding to at least two of all the current sensors,
the controller is further configured to act as a temperature abnormality determination section for determining which of all the current sensors has failed, and
the subject one temperature detection sensor is the temperature sensor other than the temperature sensor determined to have failed by the temperature abnormality determination section.

4. The control apparatus according to claim 2, wherein
the power conversion circuit includes switches manipulated to apply the AC voltage to the electric rotating machine,
the temperature sensors includes a first temperature sensor for detecting temperature of the current sensor and a second temperature sensor for detecting temperature of the switches,
the controller is further configured to act as a first abnormality determination section for determining whether the first temperature sensor has failed, and
the temperature estimation section estimates the temperature of each of all the current sensors based on a temperature detection value of the second temperature sensor without using the reference temperature on condition that the first temperature sensor is determined to have failed by the first abnormality determination section.

5. The control apparatus according to claim 4, wherein the controller is further configured to act as a first state-determination section that determines whether each of the first and second temperature sensors is in thermal equilibrium state with surroundings, a first learning section that learns, as a first initial deviation, a deviation between a temperature detection value of the first temperature sensor and a temperature detection value of the second temperature sensor on condition that each of the first and second temperature sensors is determined to be in the thermal equilibrium state with surroundings by the first state-determination section,
the temperature estimation section being configured to estimate the temperature of each of all the current sensors based on the first initial deviation learned by the first learning section and the temperature detection value of the second temperature sensor without using the reference temperature on condition that the first temperature sensor is determined to have failed by the first abnormality determination section.

6. The control apparatus according to claim 2, wherein
the control system includes a plurality of sets of the electric rotating machine and the inverter, one of the sets being a first system, one of the sets other than the first system being a second system,
the temperature sensors are provided by one for each of the first and second systems,
the temperature sensors include a first temperature sensor provided in the first system and a second temperature sensor provided in the second system,
each of the first and second temperature detection systems includes a controller configured to act as a second state-determination section that determines whether each of the first and second temperature sensors is in a thermal equilibrium state with surroundings, a second learning section that learns, as a second initial deviation, a deviation between a temperature detection value of the first temperature sensor and a temperature detection value of the second temperature sensor on condition that each of the first and second temperature sensors is determined to be in the thermal equilibrium state with surroundings by the second state-determination section, and a second abnormality determination section for determining which of the first and second temperature sensors has failed, wherein
when one of the first and second systems which is determined to have failed is referred to as an abnormal system, the other of the first and second system being referred to as a normal system, the temperature estimation section estimates temperature of each of all the current sensors provided in the abnormal system based on the reference temperature for the normal system and the second initial deviation learned by the second learning section.

7. The control apparatus according to claim 1, wherein the controller is further configured to act as a speed calculation section for calculating the rotational speed of the electric rotating machine,
the speed determination section being configured to determine that the rotational speed is in the high speed region if the rotational speed calculated by the speed calculation section is higher than the threshold speed, or in the low speed region if the rotational speed calculated by the speed calculation section is lower than or equal to the threshold speed.

8. The control apparatus according to claim 1, wherein the controller is further configured to act as a determination value calculation section that calculates, as a determination value, a time-averaged value or a root mean square value of the current detection value of each of all the current sensors, and a deviation calculation section that calculates, as a determination deviation, a difference between a minimum value and a maximum value of the determination values for all the current sensors,
the speed determination section being configured to determine that the rotational speed is in the high speed region if the determination deviation is higher than a specified value, or in the low speed region if the determination deviation is lower than or equal to the specified value.

9. The control apparatus according to claim 1, wherein
the power conversion circuit includes three sets of series connections of an upper arm switch and a lower arm switch provided corresponding to the three phases of the electric rotating machine,
connection nodes between the upper arm switch and the lower arm switch of the series connections are electrically connected to coils of the electric rotating machine through conductive members, and each of the current sensors is mounted in a state of being in contact with a corresponding one of the conductive members.

\* \* \* \* \*

UNITED STATES PATENT AND TRADEMARK OFFICE
CERTIFICATE OF CORRECTION

PATENT NO. : 10,103,677 B2
APPLICATION NO. : 15/062603
DATED : October 16, 2018
INVENTOR(S) : Yuya Fujishima et al.

It is certified that error appears in the above-identified patent and that said Letters Patent is hereby corrected as shown below:

In the Claims

Column 17, Line 10 "the non second current sensor" should be ---the second current sensor---

Column 17, Line 27 "the subject one temperature detection sensor" should be ---the one temperature sensor---

Signed and Sealed this
Eighteenth Day of June, 2019

Andrei Iancu
*Director of the United States Patent and Trademark Office*